United States Patent
Becker et al.

(10) Patent No.: US 8,221,898 B2
(45) Date of Patent: Jul. 17, 2012

(54) MULTI-LAYERED COMPOSITE PART MADE OF STEEL HAVING OPTIMIZED PAINT ADHESION

(75) Inventors: Jens-Ulrik Becker, Duisburg (DE); Peter Seyfried, Dortmund (DE); Michael Steinhorst, Esssen (DE); Horst Walter Tamler, Witten (DE); Roland Wunderlich, Bergkamen (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 127 days.

(21) Appl. No.: 12/599,233

(22) PCT Filed: Apr. 25, 2008

(86) PCT No.: PCT/EP2008/055072
§ 371 (c)(1),
(2), (4) Date: May 18, 2010

(87) PCT Pub. No.: WO2008/138729
PCT Pub. Date: Nov. 20, 2008

(65) Prior Publication Data
US 2010/0323216 A1    Dec. 23, 2010

(30) Foreign Application Priority Data
May 10, 2007    (DE) .................. 10 2007 022 453

(51) Int. Cl.
*B32B 15/18* (2006.01)
*B32B 15/04* (2006.01)

(52) U.S. Cl. .................. 428/624; 428/683; 428/686

(58) Field of Classification Search .................. None
See application file for complete search history.

(56) References Cited

U.S. PATENT DOCUMENTS

| | | | | |
|---|---|---|---|---|
| 2,002,229 | A | * | 5/1935 | Trembour et al. .............. 29/414 |
| 2,041,519 | A | * | 5/1936 | Altgelt .......................... 428/683 |
| 2,342,104 | A | * | 2/1944 | Holt ............................. 148/220 |
| 2,474,682 | A | * | 6/1949 | Liebowitz ..................... 428/610 |
| 3,610,290 | A | * | 10/1971 | Anderson et al. ............. 138/143 |
| 3,849,079 | A |  | 11/1974 | Montuelle et al. ........... 29/183.5 |
| 4,881,430 | A | * | 11/1989 | Hubbard ...................... 76/104.1 |
| 5,185,044 | A | * | 2/1993 | Verhoeven et al. ........... 148/546 |
| 5,815,790 | A | * | 9/1998 | Billgren et al. ................... 419/5 |

(Continued)

FOREIGN PATENT DOCUMENTS
DE    2 062 552    9/1971
(Continued)

OTHER PUBLICATIONS
International Search Report for International Application No. PCT/EP2008/055072, Feb. 2010.

*Primary Examiner* — John J Zimmerman
(74) *Attorney, Agent, or Firm* — Proskauer Rose LLP

(57) ABSTRACT

A multilayered composite part includes a plurality of steel alloy layers connected to one another, with at least one core layer consisting of a soft, well deformable steel alloy and at least one steel alloy layer of a very high strength steel alloy, arranged on the core layer. A multilayered composite part which is characterized simultaneously by a high strength paired with very good outer skin quality and very good paint adherence, is achieved in that at least one outer steel alloy layer of a soft, well deformable steel alloy is provided on the very high strength steel alloy layer.

11 Claims, 1 Drawing Sheet

U.S. PATENT DOCUMENTS

| | | | |
|---|---|---|---|
| 2003/0029530 A1 | 2/2003 | Junius | 148/516 |
| 2011/0111252 A1* | 5/2011 | Becker et al. | 428/624 |
| 2011/0227400 A1* | 9/2011 | Stich et al. | 301/63.101 |

FOREIGN PATENT DOCUMENTS

| | | | |
|---|---|---|---|
| DE | 2062552 | | 9/1971 |
| DE | 100 11 758 | | 9/2001 |
| DE | 10 2005 006 606 | | 3/2006 |
| EP | 0 355 046 | | 2/1990 |
| EP | 0 710 732 | | 5/1996 |
| EP | 1 052 089 | | 11/2000 |
| GB | 1 320 239 | | 6/1973 |
| GB | 2 150 151 | | 6/1985 |
| JP | 60 082691 | | 5/1985 |
| JP | 62-97783 | * | 5/1987 |
| JP | 2000-192493 | * | 7/2000 |

* cited by examiner

MULTI-LAYERED COMPOSITE PART MADE OF STEEL HAVING OPTIMIZED PAINT ADHESION

CROSS-REFERENCE TO RELATED APPLICATIONS

This application is a National Phase Application of International Application No. PCT/EP2008/055072, filed on Apr. 25, 2008, which claims the benefit of and priority to German patent application no. DE 10 2007 022 453.4-16, filed on May 10, 2007. The disclosures of the above applications are incorporated herein by reference in their entirety.

FIELD OF THE INVENTION

The invention relates to a multilayered composite part consisting of a plurality of layers of steel alloys connected to one another, with at least one core layer made of a soft, well deformable steel alloy and at least one layer of a very high strength steel alloy arranged on the core layer. The invention also relates to a component manufactured from this composite part.

BACKGROUND

In order to obtain further possibilities for use of steel or steel alloys, constantly higher demands are being imposed on sheets, semi-finished products, and components. The resulting properties of sheets, however, are increasingly contradictory. For example, the reduction of the sheet thicknesses and the reduction of weight call for the use of stronger and very high strength steels. These have poor deformation qualities, however, and usually also have a reduced surface quality, with the result that their use as painted outer skin parts is not possible. From German Patent Specification DE 10 2005 006 606, for example, a method is known for the plating of steel strips in order to attain specific property combinations of the steel strips which are not attainable with a single material. By combining wear-resistant outer layers of a very high strength steel alloy with a core layer made of a soft, well deformable steel alloy, a good wear resistance with good deformability of the composite part so manufactured can be achieved. The known plated steel sheets, however, in part also do not fulfil the requirements in vehicle construction. For example, a semi-finished product or component used as an outer skin must, in addition to very high strength values, have very good surface properties after forming and good paint adherence. Although the high strength values can be obtained with very high strength steels, their surface properties after forming are yet not optimum.

SUMMARY OF THE INVENTION

Taking the above as a basis, an aspect of the present invention is to provide a multilayered composite part which is characterized simultaneously by a high strength paired with very good outer skin quality and very good paint adherence. In addition to this, another aspect of the invention is to propose a component manufactured from the composite part.

According to a first teaching of the present invention, the first aspect described above is achieved by a generic composite part in that at least one outer layer of a soft, well deformable steel alloy is provided on the very high strength steel alloy layer.

The inner core layer, together with the layer of a very high strength steel alloy arranged on it, leads on the one hand to good shaping properties and, on the other hand, to very high strength values even with low thicknesses. The at least one outer layer of a soft, well deformable steel alloy now guarantees that the surface quality of the outer layer of the composite part is improved, since soft, well deformable steel alloys in general have better surface qualities in relation to very high strength steel alloys. The multilayered composite part according to the invention is therefore ideally suited for use as an outer skin part in vehicle construction, since on the one hand it has the necessary strength due to the very high strength steel alloy layer, while on the other hand an optimization of the surface quality can be achieved by the outer layer of a soft, well deformable steel alloy. A soft, well deformable steel alloy is characterized, for example, in that its yield strength lies below 300 MPa and, at the same time, the fracture strain $A_{80}$ is >20%. Regarded as very high strength steel alloys are, in particular, steel alloys with a yield strength of more than 300 MPa, of which the fracture strain $A_{80}$ is <35%.

According to a first embodiment of the composite part according to the invention, at least one very high strength layer is arranged on both sides of the core layer, wherein preferably an outer layer of a soft, well deformable steel alloy is provided on both very high strength layers. First, the embedding of the core layer of a soft, well deformable steel alloy with layers of very high strength steel alloys on both sides leads to the strength of the composite part being perceptibly increased. If, in addition, an outer layer of a soft, well deformable steel alloy is arranged on both very high strength layers, the bending behavior and the surface quality of the composite part can be optimized, with very high strength values at the same time. With this arrangement of the steel alloy layers of the composite part it is particularly advantageous that the very high strength steel alloy layers are not arranged in the outer layers, so that critical bending radii can be avoided.

Preferably, the proportion of carbon of the very high strength steel alloy amounts to a maximum of 1.0% by weight, and particularly preferably to a maximum of 0.25% by weight. A proportion of carbon of more than 1.0% by weight would lead to an embrittlement of the very high strength steel alloy layer, such that its deformability would be limited. Since as the carbon content increases the deformation forces increase almost proportionally, the very high strength steel alloy layers have, according to a particularly preferred embodiment, proportions of carbon of a maximum of 0.25% by weight. The reduced deformation forces, which are necessary for the forming of the composite part according to the invention, allow for a more economical processing and the manufacture of formed composite parts.

An economical composite part can be provided according to a further embodiment of the present invention in that the thickness of the core layer corresponds to at least 30% of the total thickness of the composite part, since economical steel alloys can be used for the soft, well deformable core layer.

A good deformability and simultaneously a very high strength can be achieved according to another advantageous embodiment of the composite part according to the invention in that the thickness of the core layer corresponds to a maximum of 80% of the total thickness of the composite part. The strength values of the composite part can in principle be adjusted by the thickness of the very high strength steel alloy layer.

Due to the very good characteristics of the composite part according to the invention with regard to deformability and the obtainable strength values, it is advantageous if the total thickness amounts to a maximum of 2.0 mm, in particular to a maximum of 1.0 mm, and preferably to a maximum of 0.7 mm. Depending on the requirements for deformability and strength, a perceptible weight reduction can be achieved with the composite part according to the invention without having to take account of losses with regard to desired strength and deformation properties. The composite part according to the invention with said total thicknesses is therefore very well-suited for lightweight construction concepts in particular.

If the layer structure of the composite part, according to another embodiment of the composite part according to the invention, is symmetrical to the core layer, the composite part according to the invention behaves on deformation like a single-layer sheet. It is also conceivable, however, for an asymmetrical layer structure to be provided, in order, for example, to adapt the composite part in a specific manner to the stress loading state for the particular purpose of use.

According to another embodiment of the composite part according to the invention, the composite part has a metallic and/or organic coating. This coating can, for example, be provided as one-sided or two-sided. For example, the composite part can be hot-dip galvanized or electrogalvanized. Aluminium-based coatings and paints can also be used as coatings, however. Due to the soft outer steel alloy layer, the composite part according to the invention allows for a very good coating with good surface properties.

According to a second teaching of the present invention, the aspect described above is achieved by a component which is produced from a composite part according to the invention by forming the composite part. With regard to the advantages of the component according to the invention, reference is made to the description of the advantages of the composite part according to the invention.

According to a first embodiment of the component according to the invention, the component is a structural part or an outer skin part of a motor vehicle. As already described heretofore, the component manufactured from the composite part according to the invention combines high strength values with simultaneously good surface properties, even after forming. To this extent, due to the excellent surface quality of the manufactured component, this can be used particularly well as an outer skin part, and, for example, can be subsequently painted. In application, therefore, a very good outer layer of paint can be provided. Because of the good deformability, paired with very high strength values, the component is preferably also a structural part, such as a side impact carrier, a B-column, a seat cross-member, or a floor sheet. All the structural parts referred to require, with good strength properties, good deformability with simultaneously low weight. These requirements can be fulfilled by the component according to the invention without further ado.

BRIEF DESCRIPTION OF THE DRAWINGS

There are a large number of possibilities for designing and further developing the multilayered composite part according to the invention or the component according to the invention. In this respect, reference is made on the one hand to the Patent Claims, as well as, on the other hand, to the description of an embodiment in conjunction with the drawings. The drawings show in FIG. 1 a cross-sectional view of an embodiment of the composite part according to the invention, and FIG. 2 a diagrammatic representation of the course of the yield strength values over the cross-section of the composite part according to the invention.

DESCRIPTION

Figure 1:
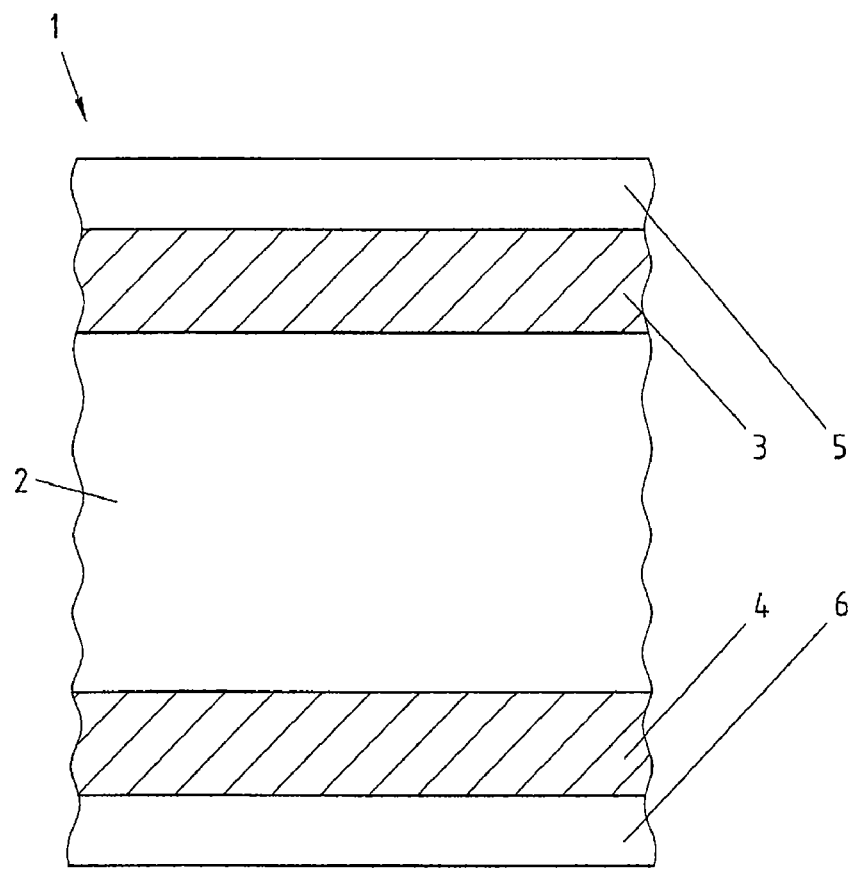

FIG. 1 shows, in a cross-sectional view, an embodiment of a multilayered composite part 1 according to the invention, which has a core layer 2 and, arranged on the core layer, layers of a very high strength alloy 3, 4, and an outer layer 5, 6.

The core layer 2, as already described, consists of a soft, well deformable steel alloy layer with a thickness of, for example, 0.25 mm. For the core layer, use can be made of all well deep-drawable and economical steel alloys, for example with a yield strength of less than 260 MPa and a fracture strain $A_{80}$ of >30%. These steel alloys are particularly economical. For example, for the core layer 2 use can be made of a steel alloy of the type DC 03 with a yield strength of 160 MPa and a fracture strain $A_{80}$ of more than 50%. The said soft, well deformable steel alloy, however, represents only one example of the steel alloy which can be used for the core layer 2 of the composite component according to the invention.

Very high strength steel alloy layers 3, 4 are arranged on both sides of the soft, well deformable core layer 2. These can consist, for example, of a martensite phase steel in accordance with the Standard prEN 10336 HDT1200M, with a yield strength of approx. 900 MPa and a fracture strain of approx. 5%. In the present embodiment of the composite part 1 according to the invention, the thickness of the very high strength steel alloy layers 3, 4 amounts to 0.075 mm. Due to the extremely high strength properties, the thickness of the very high strength steel alloy layers 3, 4 essentially determines the strength properties of the composite part according to the invention. The outer steel alloy layers 5, 6 in turn consist preferably of a micro-alloyed IF steel of the HX160YD quality (according to EN Standard), which has especially good stretch- and deep-drawing properties and simultaneously can be easily galvanized and/or painted. The outer steel alloy layers have in the present embodiment a thickness of 0.05 mm, wherein its yield strength amounts to 120 MPa and the fracture strain ($A_{80}$) is approx. 38%. The total thickness of the embodiment of the composite part 1 according to the invention in this respect amounts to 0.5 mm with a core layer proportion of 50%. The structure of the present embodiment is symmetrical to the core layer 2. Depending on the requirements of the application, however, it may also be asymmetrical. The embodiment represented in FIG. 1 of the composite part according to the invention is excellently suited to the manufacture of outer skin parts of a motor vehicle, since it has a particularly good buckling strength.

Figure 2:
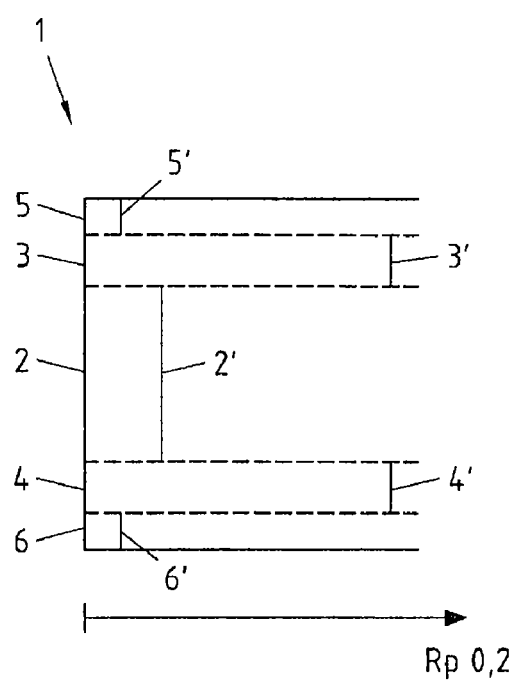

In FIG. 2 now the individual yield strengths of the individual steel alloy layers 2', 3', 4', 5' and 6' are qualitatively plotted against the thickness of the composite part 1. It can clearly be seen that the very high strength steel alloy layers 3, 4 have very high yield strengths 3', 4', such that the composite part of the embodiment represented has in total an effective yield strength of more than 300 MPa with simultaneously good deformability over the entire thickness.

What is claimed is:

1. Multilayered composite part comprising a plurality of steel alloy layers connected to one another, with at least one core layer and at least one steel alloy layer, of a very high strength steel alloy, arranged on the core layer, and with at least one outer steel alloy layer provided on the very high strength steel alloy layer, wherein the core layer consists of a soft, well deformable steel alloy, the outer steel alloy layer consists of a soft, well deformable steel alloy and the total thickness amounts to a maximum of 2.0 mm, the thickness of the core layer corresponds to at least 30% of the total thickness of the composite part.

2. Composite part according to claim 1, wherein arranged on both sides of the core layer is at least one very high strength steel alloy layer, wherein preferably an outer steel alloy layer made of a soft, well deformable steel alloy is provided on both very high strength steel alloy layers.

3. Composite part according to claim 1, wherein a proportion of carbon of the very high strength steel alloy amounts to a maximum of 1.0% by weight.

4. Composite part according to claim 1, wherein the thickness of the core layer corresponds to a maximum of 80% of the total thickness of the composite part.

5. Composite part according to claim 1, wherein the total thickness amounts to a maximum of 1.0 mm.

6. Composite part according to claim 1, wherein the plurality of steel alloy layers of the composite part forms a layer structure, the layer structure of the composite part is symmetrical to the core layer.

7. Composite part according to claim 1, wherein the composite part has a metallic and/or organic coating.

8. Component manufactured from the composite part according to claim 1, by shaping the composite part.

9. Component according to claim 7, wherein the component is a structural part or an outer skin part of a motor vehicle.

10. Composite part according to claim 3, wherein the proportion of carbon of the very high strength steel alloy amounts to a maximum of 0.25% by weight.

11. Composite part according to claim 5, wherein the total thickness amounts to a maximum of 0.7 mm.

* * * * *